United States Patent [19]
Holzhauer et al.

[11] Patent Number: 4,984,269
[45] Date of Patent: Jan. 8, 1991

[54] TELEPHONE BRACKET, IN PARTICULAR FOR VEHICLES

[75] Inventors: Horst Holzhauer, Schellbronn; Eberhard Löffler, Stuttgart; Rudi Kneib, Sindelfingen, all of Fed. Rep. of Germany

[73] Assignee: Daimler-Benz AG, Fed. Rep. of Germany

[21] Appl. No.: 442,297

[22] Filed: Nov. 28, 1989

[30] Foreign Application Priority Data
Dec. 24, 1988 [DE] Fed. Rep. of Germany ....... 3843817

[51] Int. Cl.$^5$ .............................................. H04M 1/00
[52] U.S. Cl. .................... 379/454; 379/438; 379/435; 379/437
[58] Field of Search ............... 379/437, 438, 451, 454, 379/457, 58, 435; 439/501, 502; 248/52, 51

[56] References Cited
U.S. PATENT DOCUMENTS
3,373,954  3/1968  Hilsinger, Jr. ..................... 379/438
4,868,862  9/1989  Ryoichi et al. ..................... 379/58

FOREIGN PATENT DOCUMENTS
2157915  9/1940  United Kingdom .

Primary Examiner—Jin F. Ng
Assistant Examiner—Jason Chan
Attorney, Agent, or Firm—Evenson, Wands, Edwards, Lenahan & McKeown

[57] ABSTRACT

A telephone bracket, for example, for vehicles, has a reception recess for a support plinith, on which a hand receiver can be fastened, to which a spiral cable is connected, which is accommodated in a cable storage container, which adjoins the reception reces and has a cavity, which extends in the direction of a vehicle floor and into which a cable deflection member can be inserted from above, which is arranged in it so that it can be quickly removed again and around which the spiral cable is guided.

3 Claims, 2 Drawing Sheets

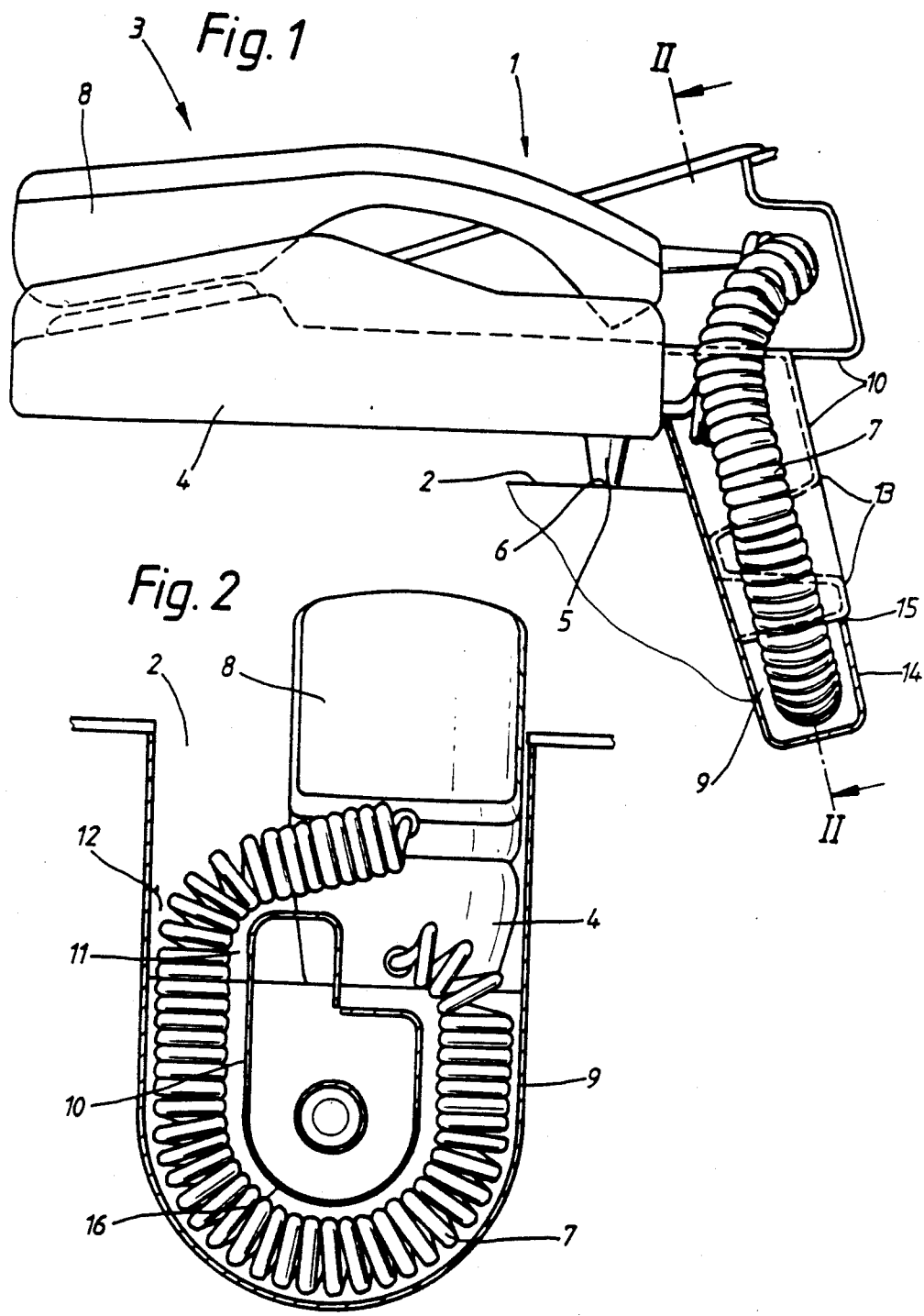

TELEPHONE BRACKET, IN PARTICULAR FOR VEHICLES

BACKGROUND AND SUMMARY OF THE INVENTION

The present invention generally relates to a telephone bracket, and more particularly to a telephone bracket for a vehicle having a cable storage container which effects a retraction of a stretched spiral cable and makes possible the rapid transfer of a telephone to another vehicle.

From German Patent Specification (DE-PS) No. 2,822,378, a telephone bracket for motor vehicles is disclosed, which has a reception recess for a support plinth, on which a hand receiver can be fastened, to which a spiral cable is connected, which is guided around a cable deflection roller and ends in a connector plug. This cable deflection roller is mounted flat in the reception recess and, according to the cable length, must be so far removed with its axis from the hand receiver that the spiral cable cannot form any additional twists. In order that the spiral cable does not lift up from the cable deflection roller, this cable storage location must be covered with a cover. The transverse extent of this arrangement with a user-friendly connection cable, which is available with a great length, is particularly large and thus wastes construction space and, as a result of the necessary covering, is costly.

An object of the present invention is to provide a telephone bracket for a vehicle, in which bracket there is a cable storage container, which effects a retraction of a stretched spiral cable without inconvenient residual length, and which makes possible rapid transfer of a telephone into another vehicle.

A telephone bracket according to preferred embodiments of the invention offers an accommodation for a spiral cable of a hand receiver, the accommodation requiring little space as a result of a predetermined alignment thereof in the telephone bracket in a direction of a vehicle floor and which makes use of the mass of the cable for its retraction into a cable storage container. By means of a quickly releasable and removable cable deflection member, a telephone can also be transferred as required into other vehicles, which are equipped with a corresponding telephone bracket.

The retraction of the spiral cable into the cable storage container, which is ensured by this arrangement, has advantages which include that, when the hand receiver is set down, the spiral cable does not get pinched between the support plinth and the telephone receiver. As a result, this arrangement does not hinder the locking of the hand receiver. Further, the activation of a contact switch, which ends the conversation, can take place in every case.

The cable deflection member can, in this connection, be quickly and inexpensively locked in position in the reception recess together with the support plinth, for example by a socket pin, which holds both of them. As a result, when the telephone is transferred, the cable deflection member is, at the same time, freed and releases the spiral cable. The retraction of the spiral cable into the cable storage container is promoted by an unstretched spiral cable length which is shorter than the deflection path around the cable deflection member and a pretension, which is consequently brought about in the spiral cable.

Other objects, advantages and novel features of the present invention will become apparent from the following detailed description of the invention when considered in conjunction with the accompanying drawings.

BRIEF DESCRIPTION OF THE DRAWINGS

FIG. 1 shows a longitudinal section through a cable storage container with inserted cable deflection member according to one embodiment of the present invention, FIG. 2 shows a view corresponding to the direction arrows and the line II—II in FIG. 1.

DETAILED DESCRIPTION OF THE DRAWINGS

Figure 3:
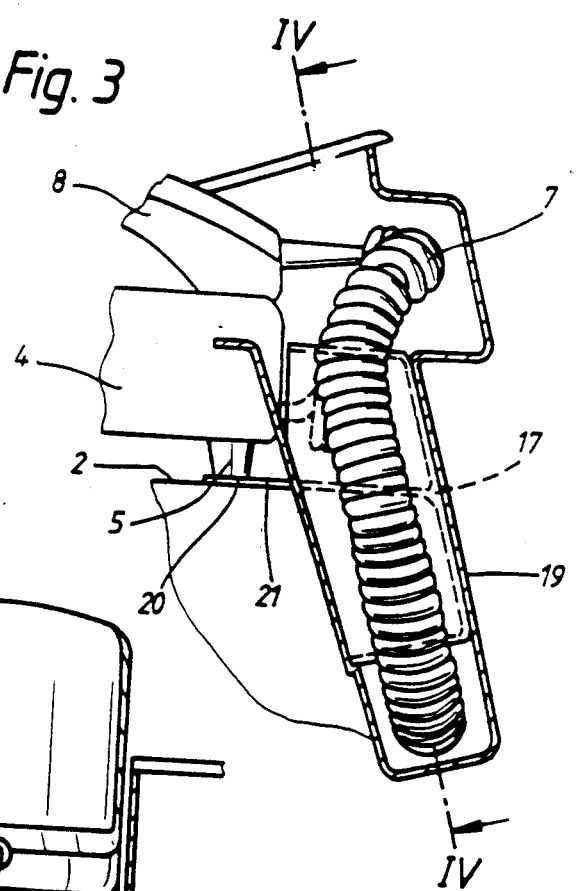
FIG. 3 shows a further embodiment of a cable deflection member in a cable storage container.

Two exemplary embodiments of the invention are represented in the drawings.

As shown in FIG. 1, a telephone bracket 1 in a motor vehicle has a reception recess 2, which is here only represented to a limited extent, which can be situated in a conventional manner between front vehicle seats and in which a telephone 3 can be fastened. The telephone 3 comprises a support plinth 4, which contains various technical telephone components and which can be locked in position in seats 6 in the reception recess 2, in this case, by several socket pins 5 on the underside.

A hand receiver 8 is connected to the support plinth 4 by a spiral cable 7 and can be set down upon the support plinth 4 and at the same time locked with it. In order that this spiral cable 7 does not push between the receiver 8 and the support plinth 4 and prevent the locking of the hand receiver 8 and the ending of the conversation, when the hand receiver 8 is set down, the spiral cable 7 is guided into a cable storage container 9, which adjoins the reception recess 2 and is integral with the telephone bracket 1, and around a cable deflection member 10 inside it.

An inner cavity 11 of the cable storage container 9 receiving the spiral cable 7, according to advantageous embodiments of the invention, extends downwards towards the vehicle floor and, as a result of this, makes use of the mass of the spiral cable 7 for a retraction movement thereof into the cable storage container 9.

Furthermore, the spiral cable 7 is, in this connection, laid in the direction of pull. Thus, when the hand receiver 8 is raised, the cable 7 is at most slightly bent at an entrance opening 12 into the cable storage container 9, so that the retraction and extension movement of the spiral cable 7 takes place particularly smoothly.

Moreover, only a small space requirement is consequently necessary in the plane of the bracket 1, which is very advantageous, as only a very limited amount of installation space is available in vehicles in the operating area of the driver. Such a telephone bracket 1 is thus also suitable for motorcycles, for example, which also have limited construction space in a transverse direction of the motorcycle.

It is likewise advantageous to constructionally adapt to one another the length of the spiral cable 7 and the deflection path around the cable deflection member 10, so that no cable loops occur, and thus, for example, to select an unstretched cable length to be slightly shorter than this deflection path, so that the spiral cable 7 is always subject to tension and has a tendency to pull back into the cable storage container 9.

In FIGS. 1 and 2, a cable deflection member 10 is illustrated, which is inserted from above into the cable storage container 9 and the fastening of which can be quickly released again. This cable deflection member 10 forms, with a rear wall 13, a component of a rear wall 14 of the telephone bracket 1 and can be guided into its final position, for example, by guide edges 15 on the rear wall 14.

Thus, it is possible to run the spiral cable 7 around a rounding 16 formed on the cable deflection member 10 and to lower the spiral cable 7 together with the cable deflection member 10 into the cable storage container 9 into a position which is predetermined by guide edges 15. By the subsequent locking of the support plinth 4 in seats 6 of the reception recess 2, the cable deflection member 10 can no longer be removed but can, in the event of transfer of the telephone into another vehicle, be released once again just as easily and quickly.

Figure 4:
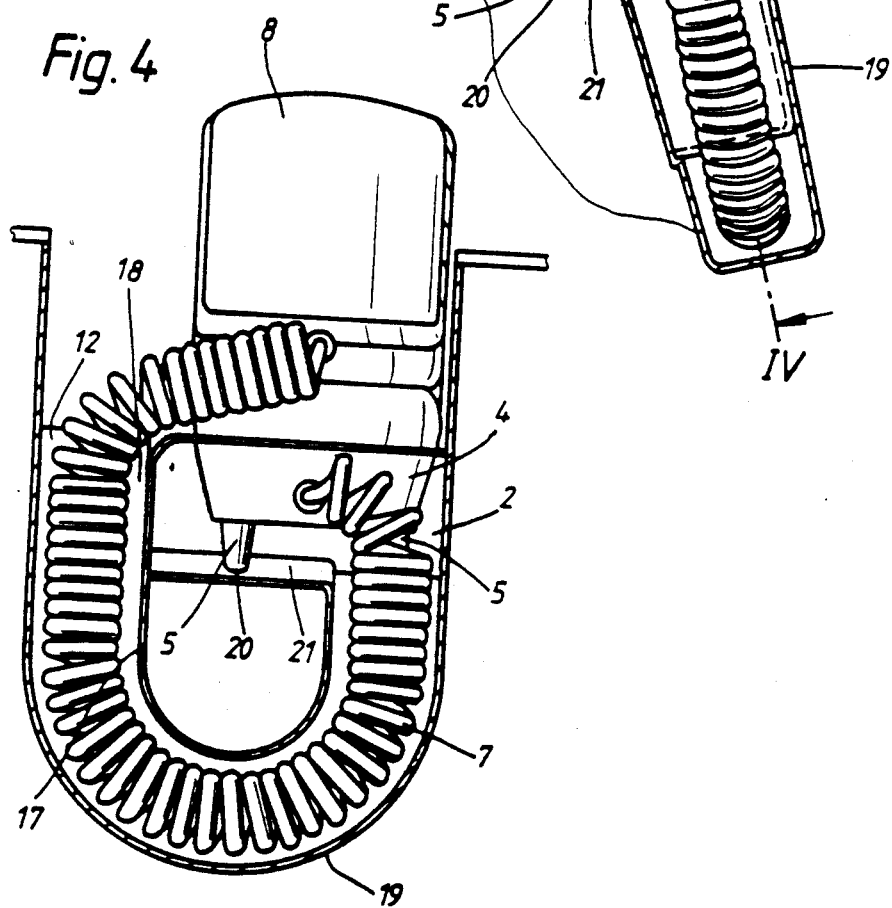
FIG. 4 shows a view corresponding to the direction arrows and the line IV—IV in FIG. 3.

The embodiment in FIGS. 3 and 4 differs from that described above only to the extent that, in this case, a cable deflection member 17 is completely inserted into a cavity 18 of a cable storage container 19 and is locked in position in the reception recess 2 at the same time as the support plinth 4 by means of the socket pin 5 of the support plinth 4, which pin projects through an opening 20 in a tongue 21 of the cable deflection member 17. After the release of this plinth locking, for example by means of conventional push-button operation, the cable deflection member 17, after removal of the support plinth 4 or even together with the latter, can be taken out of the telephone bracket 1 and thus releases the spiral cable 7 from the cable storage container 19.

An advantageous, quickly releasable fastening of the cable deflection member 17 is also possible for a support plinth which does not require a socket pin to be locked in position, if such a tongue 21 of the cable deflection member 17 is only brought between an underside surface of the support plinth 4 and the reception recess 2, so that again removal of the cable deflection member 17 is blocked, but only by the support plinth 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A telephone bracket which has a reception recess for a support plinth on which a hand receiver can be fastened, a spiral cable connected to the hand receiver being guided around a cable deflection member, wherein a cable storage container adjoins the reception recess and has a cavity, which extends downwards towards a vehicle floor and into which the cable deflection member is inserted from above, and wherein securing means are provided for securing the cable deflection member for quick removal.

2. A telephone bracket according to claim 1, wherein the cable deflection member is locked in position in the reception recess together with the support plinth by the securing means which comprises a socket pin, which holds both the cable deflection member and support plinth.

3. A telephone bracket according to claim 1, wherein an unstretched spiral cable is shorter than a deflection path around the cable deflection member.

* * * * *